Oct. 3, 1939.   H. M. HUNTER   2,174,748
FILTER
Filed Feb. 18, 1938   5 Sheets-Sheet 1
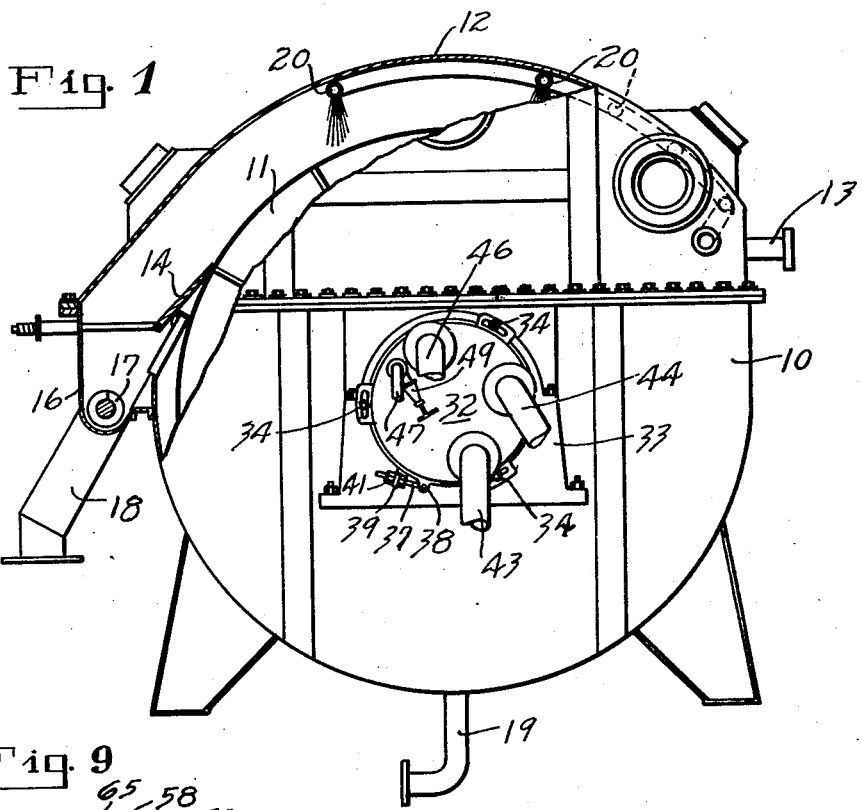
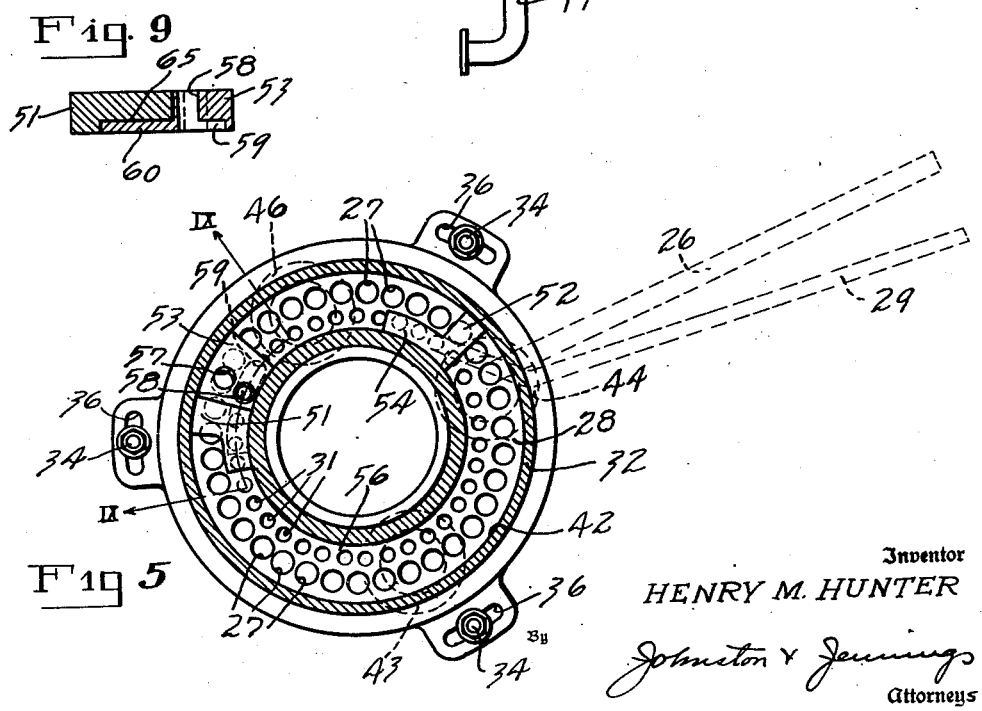
Inventor
HENRY M. HUNTER
Johnston & Jennings
Attorneys Inventor
HENRY M HUNTER
Johnston & Jennings
Attorneys

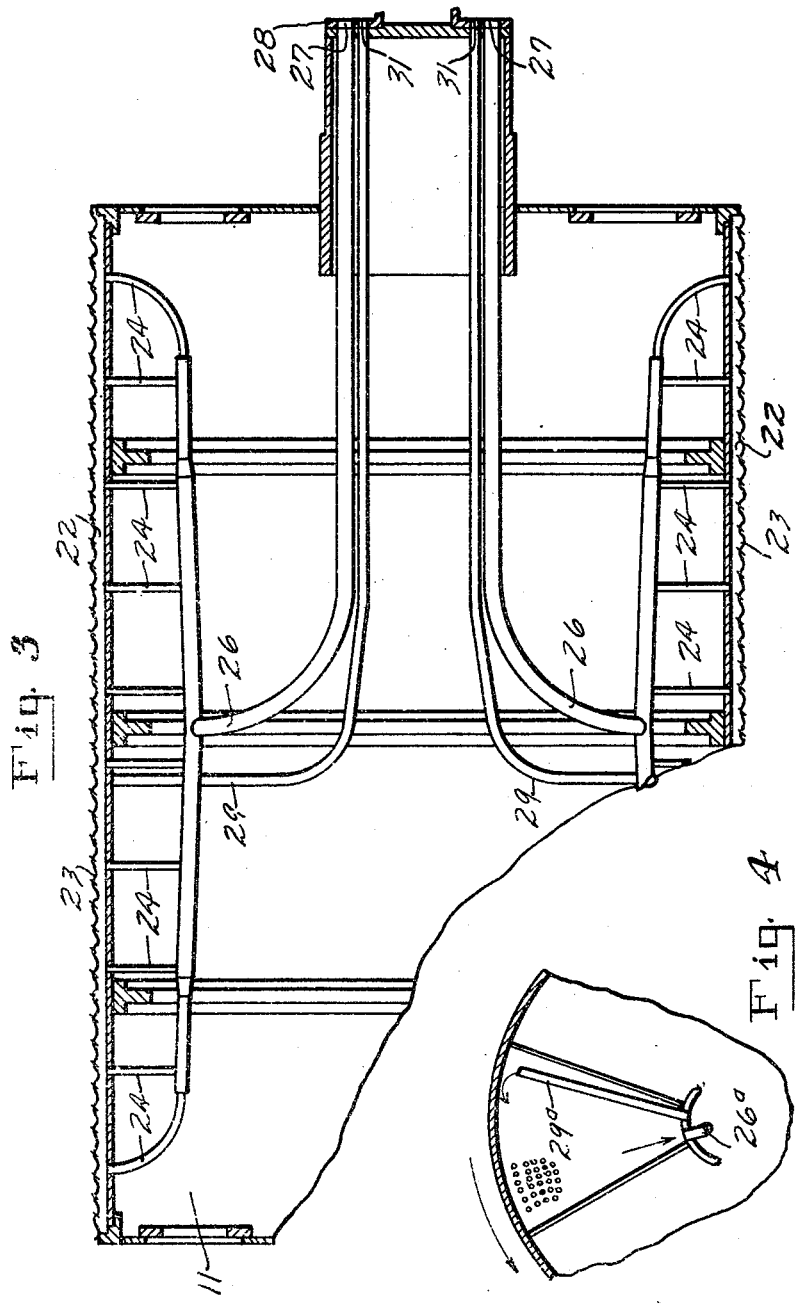

Oct. 3, 1939.  H. M. HUNTER  2,174,748
FILTER
Filed Feb. 18, 1938  5 Sheets-Sheet 4
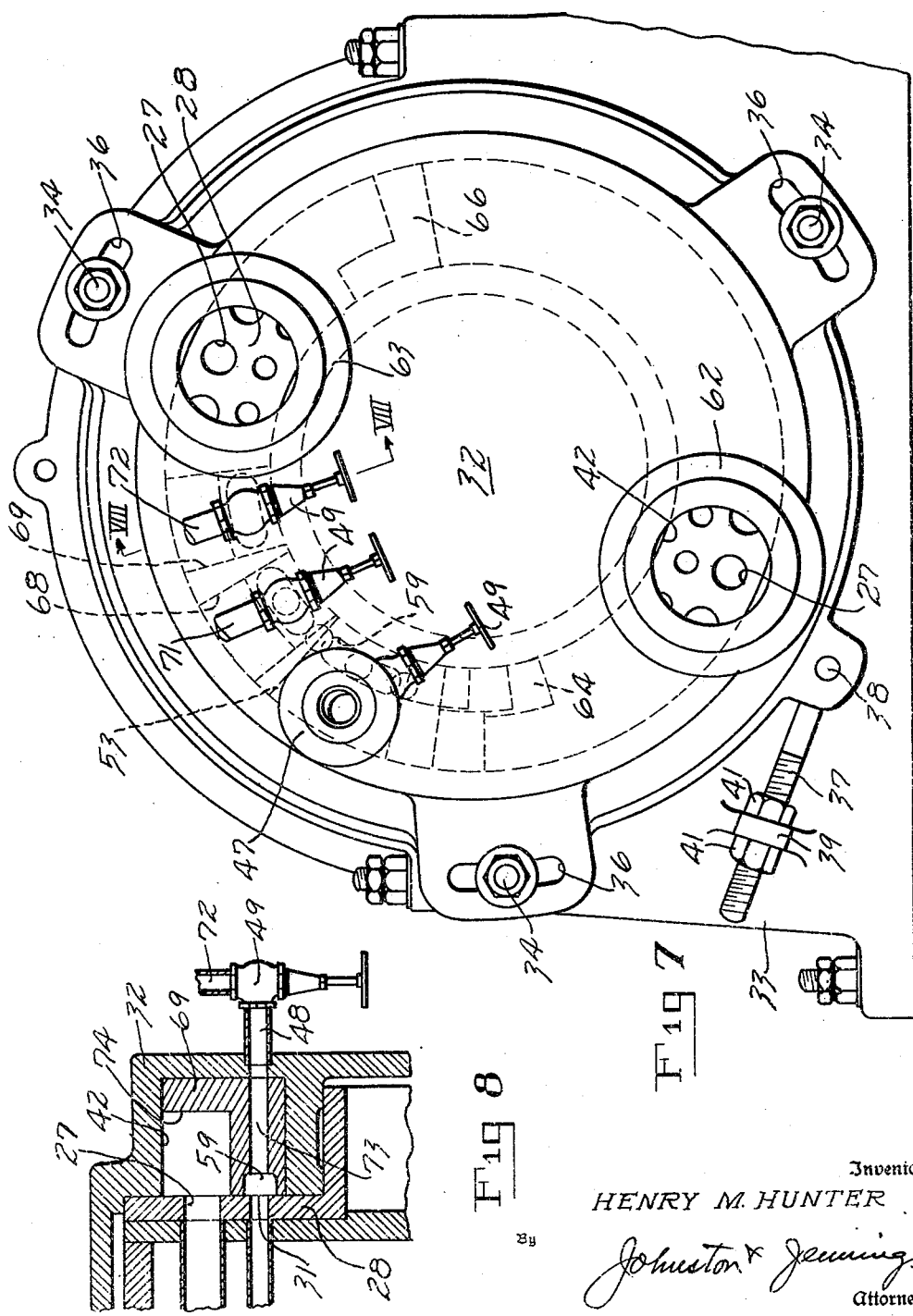
Inventor
HENRY M. HUNTER
By
Johnston & Jennings
Attorneys Oct. 3, 1939.  H. M. HUNTER  2,174,748
FILTER
Filed Feb. 18, 1938  5 Sheets-Sheet 5

Inventor
Henry M. Hunter
BY Johnston & Jennings
Attorneys

Patented Oct. 3, 1939

2,174,748

UNITED STATES PATENT OFFICE

2,174,748

FILTER

Henry M. Hunter, New York, N. Y., assignor to Goslin-Birmingham Manufacturing Company, Inc., a corporation of Alabama Application February 18, 1938, Serial No. 191,135

6 Claims. (Cl. 210—199)

This invention relates to continuous filters and has for its object the provision of an improved drainage system therefor whereby a drier cake may be produced and less filtrate lost in the cake.

A further object of my invention is to provide means, in a continuous rotary drum filter, to flush out the filtrate from the filter sections before the "blow back" or removal of the cake during each filter cycle.

A still further object of my invention is to provide a filtrate connection and a flushing connection to each filter section in a continuous filter, and valve means to provide a gaseous fluid circulation through each section to flush out the filtrate prior to discharge of the cake therefrom.

In the operation of continuous rotary drum filters, either of the vacuum or combination vacuum and pressure type, the discharge of the cake built up on the filter sections during each cycle of operation is usually facilitated by a reverse blow of air or gas under pressure through the filter sections. This reverse blow, termed the "blow back", may be accomplished with filters operating at sub-atmospheric pressure by connecting the filter sections successively to the atmosphere, or by connecting each section successively to a source of relatively higher gaseous pressure, such as air, steam, or inert gas, depending upon the materials being filtered. This blow back, or atmospheric release, usually produces such a violent reversal of flow through the filtrate conduits that any liquid which may be contained in the conduits or in the filter compartment is blown back through the filter cloth and into the cake, and is thus lost, and is also objectionable from the standpoint of attaining a dry cake discharge.

With most materials, when a filter section has passed the zenith in its rotation, the cake built up on the section cracks sufficiently to permit the surrounding atmosphere, either air or inert gas, to permeate the cake and allow the filtrate held in the compartment and drainage conduits to flow out prior to reaching the point in the filter cycle where the blow back occurs. It will be apparent that when a heavy cake is built up on the outside of the filter cloth, that filtrate may be discharged from the compartment or section beneath the cloth, by displacement either by more filtrate or wash permeating the cake, or by means of air or gas forced through the cake by pressure differential; hence the importance of the cracking of the cake to permit the air or gas to permeate it and displace the liquid in the compartment beneath it. With some materials, however, the cake formed on the filter cloth is impermeable and of such a consistency that cracking does not occur to such an extent that there is a natural draining of the filter compartment. With such materials, as heretofore mentioned, the filtrate in each compartment is blown out into the cake when the blow back occurs. In filtering certain materials, such, for example, as in the dewaxing of lubricating oils, expensive processing of the oil stock has taken place prior to the filtering operation and any blow back of filtrate containing oil stock or solvent oil mix into the filter cake entails considerable financial loss.

In order to overcome the beforementioned difficulties, I have provided in each filter section a flushing conduit, and have modified the construction of the valve usually employed whereby air or other gaseous medium can be admitted when the compartments are being successively drained of filtrate, by the usual vacuum connection through the valve. In accordance with one embodiment of my invention, this action may be effected over a considerable arc of travel of each filter section and in any instance may be controlled as to intensity of counterflow so as to attain most satisfactory results. Also, I may provide a separate valve entirely for the admission of a flushing medium successively to the several compartments.

Apparatus embodying features of my invention is illustrated in the accompanying drawings forming a part of this application, in which Fig. 1 is a view in end elevation, with parts broken away, of a drum type continuous filter embodying my invention;

Fig. 3 is a longitudinal sectional view of the drum showing further the arrangement of the filtrate and flushing conduits;

Fig. 4 is a fragmentary sectional view showing an arrangement of filtrate and flushing connections in a leaf type, continuous filter;

Fig. 5 is a sectional view of the valve showing the arrangement of bridges or separating blocks therein;

Fig. 7 is a view in elevation showing a slightly modified form of valve;

Fig. 8 is a detail sectional view taken along the line VIII—VIII of Fig. 7;

Fig. 9 is a sectional view taken along the line IX—IX of Fig. 5;

Figure 2:
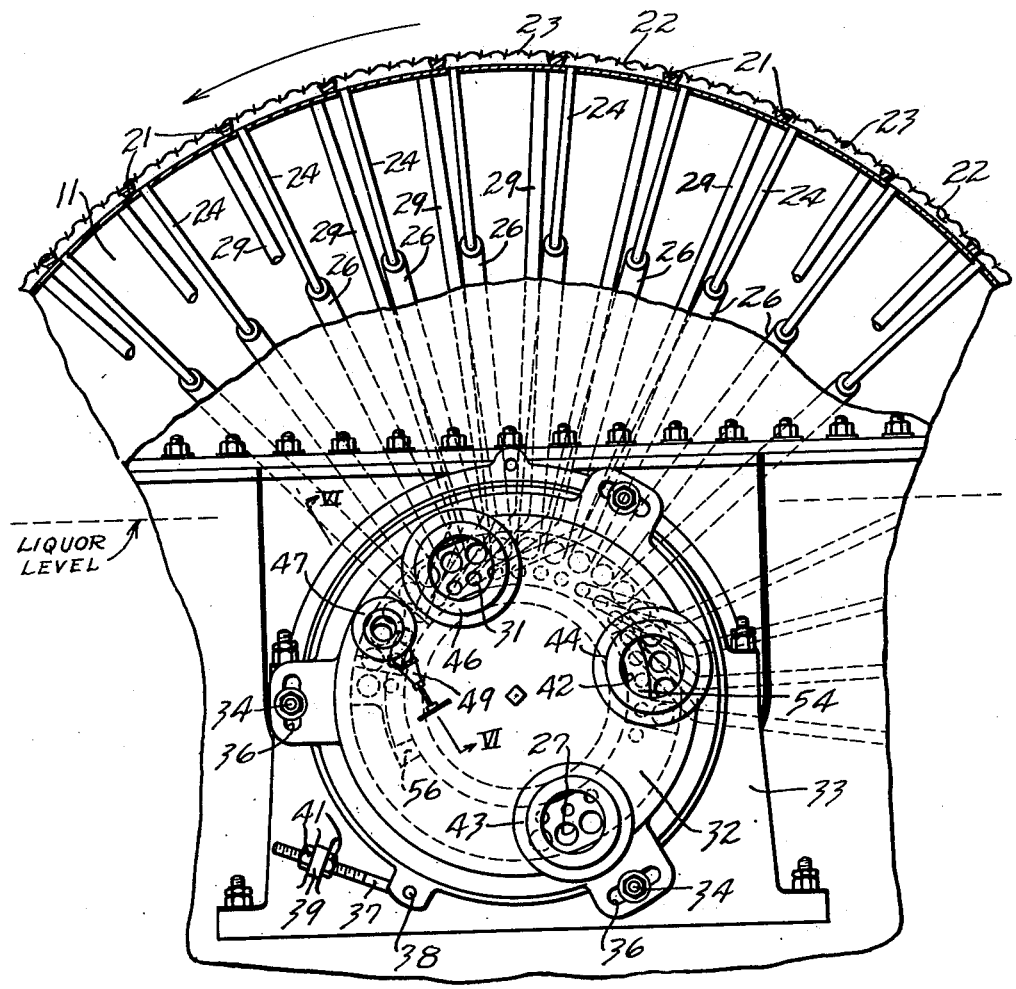
Fig. 2 is a sectional end view showing the arrangement of the filtrate and flushing conduits and their connection to the valve.

Referring now to the drawings for a better understanding of my invention, I show a filter embodying a filter tank 10 in which is located a rotary filter drum 11. A hood or cover 12 may be fitted air tight over the drum and tank whereby the filter may be operated either as a combination pressure and vacuum filter or as a vacuum filter. When operated as a combined pressure and vacuum type, air or gaseous medium is admitted to the cover 12 through a conduit 13 to create a pressure differential in the filter casing. Cake formed on the surface of the drum 11 is removed by a scraper 14 and falls into a conveyor trough 16, in which is disposed a screw conveyor 17 which discharges the cake through an outlet conduit 18. The cake formed on the filter is washed by a series of sprays 20 arranged at intervals above the surface of the drum, as is well understood. The material to be filtered is admitted to the tank 10 through an inlet conduit 19 located in the bottom of the tank.

The drum 11, as shown in Fig. 2, is divided by axially extending strips 21 into separate filter compartments 22, the whole being covered by suitable filter cloth 23. Connected to each of the filter sections 22 are a plurality of filtrate conduits 24. See Fig. 3. These filtrate conduits are arranged along the leading edge, in the direction of rotation, of each compartment. The drainage conduits 24 for each compartment are all connected to a common conduit 26 which terminates at 27 in a valve plate 28, thus forming an annular row of drainage ports 27 in said valve plate. Also connected to each filter section is a filtrate flushing conduit 29 which is connected to each filter section near the lagging edge of the section, as shown in Fig. 2. The flushing conduits terminate at the valve plate 28 in an annular row of ports 31 concentric with the outer row of drainage ports 27. As seen in Fig. 2 of the drawings, each of the ports 31 is connected with a filter section which (considered in the direction of movement) is two sections behind that section to which its associated drainage port is connected. The purpose of this, as will be seen more clearly hereinafter, is to provide for a circulation of gaseous pressure through the flushing conduit of each filter section to displace filtrate therein, while the filter section is draining through the drainage conduits 24.

With a leaf type filter, the drainage conduit 26a and flushing conduit 29a may be arranged as shown in Fig. 4 of the drawings.

Cooperating with the valve plate 28 is a stationary valve 32. The valve 32 is mounted upon the filter frame 33 by means of bolts 34 passing through slotted holes 36 carried by the valve so as to permit of a limited angular adjustment of the valve. This angular adjustment of the valve is accomplished by means of a bolt 37 pivotally connected at 38 to the valve, which passes through a bracket 39, and is provided with adjusting nuts 41.

The valve 32, shown in Fig. 5, is provided with an annular recess 42, which covers the double row of ports 27 and 31 in the valve plate. A plurality of drainage connections 43, 44 and 46 connect with the interior of the valve and serve to drain filtrate and wash from the filter compartments through the annular recess 42. As is well understood, with sub-atmospheric type filters, the conduits 43 and 44 may be connected to vacuum sources of different degree, the conduit 43 being connected to a source of low vacuum and the conduit 44 to a source of high vacuum. The conduit 46 is usually employed to recover wash water or solvent where it is desirable to collect the wash water or solvent separate from the other filtrate. At 47 is shown a pressure connection for the blow back through each filter section to loosen the cake just prior to its removal. With vacuum filters this may simply be an open conduit for the admission of atmospheric pressure, or it may be connected to a source of inert gaseous medium. Connected to the pressure conduit 47 is a second conduit 48 controlled by a valve 49, as may be seen in Fig. 6, which conduit is utilized to admit gaseous fluid under pressure through the flushing ports 31 and the flushing conduits 29, in a manner to be described immediately hereinafter.

The annular recess 42 is divided into a plurality of sections by means of bridges 51, 52 and 53. The positions of the bridges 51 and 52 may be shifted to divide the filtrate to suit operating conditions, as is well understood. Inasmuch as each flushing port 31 is connected to a filter section behind the filter section to which its associated drainage port is connected, the bridge 52 is provided with a forwardly extending portion 54 which blanks off the flushing ports 31 immediately ahead of the drainage port 27 first passing beneath the main portion of the bridge 52. This is to prevent filtrate from being drawn from the tank 10 through a flushing conduit 29 while the drainage conduit 26 is out of the tank and connected with the drainage conduit 46 for the removal of solvent or wash. Likewise the bridge 51 is provided with a forwardly extending portion 56 which serves to connect the drainage and flushing conduits of each filter section to the drainage conduit 43 at the same instant.

Figure 6:
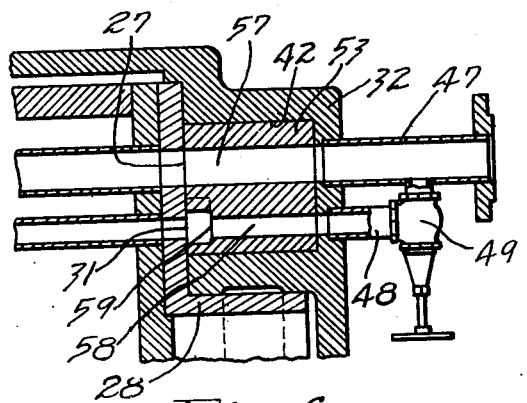
Fig. 6 is a detail sectional view of the valve taken along the line VI—VI of Fig. 2, showing the blow back and flushing connection.

The bridge 53, shown in detail in Figs. 6 and 9, is provided with a passage 57 extending through the bridge, connected directly to the pressure conduit 47, so that as each drainage port 27 passes beneath the bridge 53, pressure is admitted through the drainage port to blow back through the filter section and loosen the cake. There is also provided through the bridge 53 a passage 58 extending through the bridge to come opposite the flushing port 31 in the valve plate 28. The flushing port 31 radially inward of the drainage port 27, being connected to a filter section to the rear of the filter section to which the drainage port 27 is connected, pressure through the flushing port 31 passes through the conduit 29 to a filter section 22 which is connected to the filtrate conduit 46, so that air or other gaseous pressure is admitted to the filter section to displace any filtrate therein or in the filtrate conduits 24 and 26. In order that sufficient flushing action shall occur, I provide a slot 59 in the under face of the bridge 53 which extends circumferentially around the bridge 53 to a sufficient distance to cover two of the flushing ports 31 at a time. The degree or rate at which pressure is admitted through the conduit 48 may be controlled by the valve 49 so that there shall be ample drainage without too violent a reverse flow, and disruption of the cake at this point. Also the bridge 53 is provided with a forwardly extending portion 60 which serves to blank off the port 31 ahead of the bridge which is connected with the same filter compartment through which the blow back is occurring. There is thus no short circuiting of the blow back.

As shown in Fig. 9, the forwardly extending portion 60 is made thinner than the remaining portion of the bridge 53, and the bridge 51 is undercut at 65 so that it may overlap the forwardly extending portion 60. By thus constructing the bridges 51 and 53, action of vacuum on the filter compartments may commence earlier than otherwise, if desired.

In Fig. 7 I show a modified form of valve 61 which may have two drainage outlets 62 and 63, and be divided into compartments by bridges 64 and 66, as already described. In this form of valve I may provide, in addition to the bridge 53, a plurality of bridges 68 and 69, provided with separate valve controlled pressure connections 71 and 72. The bridge 69, which is similar in all respects to bridge 68, is shown in detail in Fig. 8. As will be seen, it has a passage 73 extending therethrough to admit flushing pressure to the flushing port 31 in the valve plate 28. Each of the bridges 68 and 69 is undercut at 74 so that the drainage ports 27 immediately beneath them are connected to the drainage outlet 63. As will be seen, this modification of the valve provides for a more extended controlled flushing action. Also the extent and intensity of the flushing action may be controlled by means of the valves which admit pressure to the flushing conduits.

Figure 11:
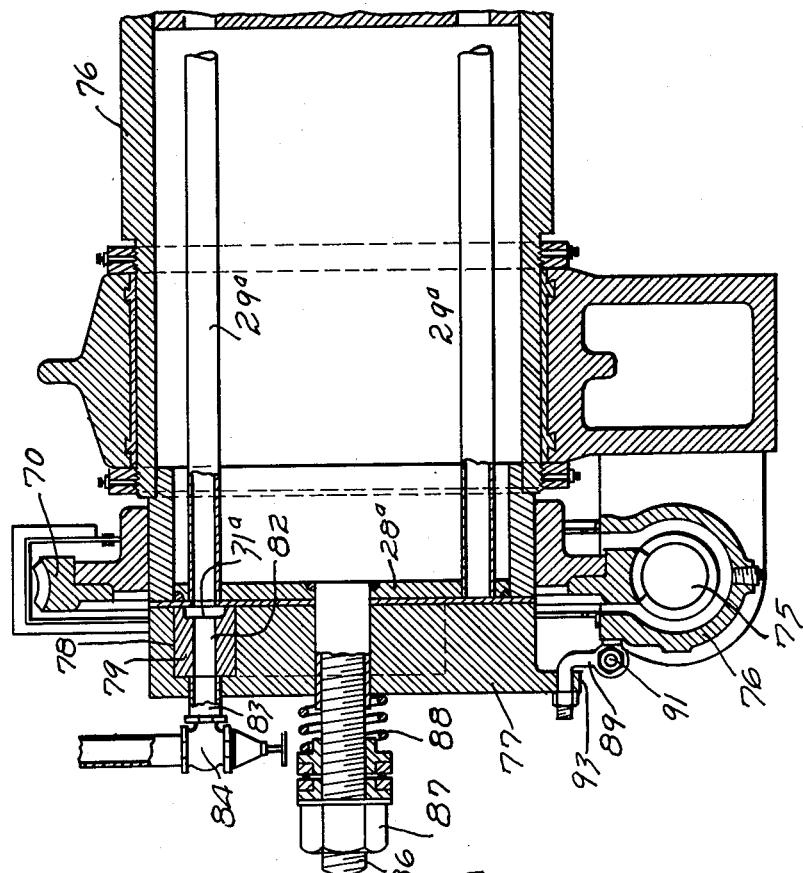
Fig. 11 is a sectional view taken on the line XI—XI of Fig. 9.
Figure 10:
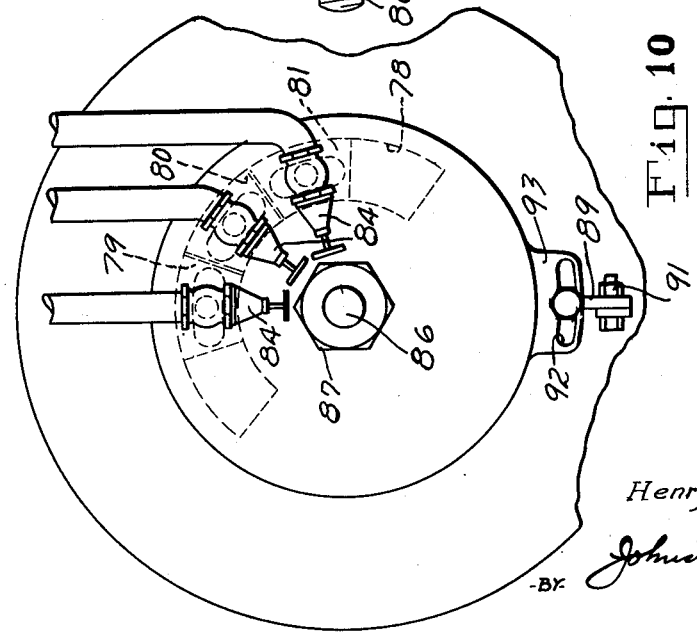
Fig. 10 is an elevational view of a separate valve for controlling the flushing action, mounted on the drive end of the filter.

Referring to Figs. 10 and 11, I show a separate valve for controlling the flushing of the filter compartments, which is mounted on the opposite, or drive end of the drum shaft 76. This form of valve may be desirable where the addition of the flushing connections to the main valve would be difficult or impractical. In this form, the flushing connections 29a terminate in a row of annular ports 31a in a valve plate 28a mounted on the drive end of the filter drum. The drive gear 70 meshes with a drive worm 75, which is disposed in a suitable housing 76. As seen in Fig. 11, the valve comprises a valve body 77 provided with an undercut arcuate passage 78, in which are located a plurality of bridges 79, 80 and 81, each of which has a passage 82 extending therethrough. Each of the passages 82 is opposite a pressure supply conduit 83 controlled by a valve 84. The passages 82 are made somewhat wider than the pressure connection 83, whereby they may be shifted in the arcuate passage 78 to vary the time of application of pressure to the filter compartments as the flushing connections 31a pass successively beneath the bridges.

The valve body 77 is secured to the end of the shaft 66 by means of a bolt 86 and nut 87. A spring 88 interposed between the nut and the valve body exerts resilient pressure against the valve body to hold it against the valve plate. The valve body is held against turning by means of an anchor bolt 89 connected at 91 to the worm drive casing 76. The anchor bolt 89 extends through a slot 92 provided in a lug 93 forming a part of the valve body which permits of a limited arcuate adjustment of the valve as a whole.

It will be understood that the form of valve just described will be used with a standard valve mounted on the opposite end of the drum and adapted to connect the filter compartments successively to the vacuum source and blow back pressure, as already described. The only function of the valve 77 is to admit pressure to the filter compartments just before the blow back and while they are connected to the vacuum source.

From the foregoing it will be apparent that I have devised an improved continuous filter which embodies means to drain completely the filter compartments and their connections before the blow back during each cycle of operation, thus insuring a drier cake and more economical operation. It will furthermore be apparent that the means thus provided are adjustable over a wide range to adopt the filter to the filtration of different substances.

While I have shown my invention in but two forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a continuous rotary filter divided into a plurality of filter compartments on each of which a cake is formed and removed during a filter cycle, a drainage connection to each compartment, a flushing pressure connection to each compartment, valve means to connect first a vacuum and then the flushing pressure successively to each filter compartment and means included in the valve means to effect simultaneously the connection of the flushing pressure and the vacuum to each section while each said section is draining and after the cake has formed.

2. In a continuous rotary filter divided into a plurality of filter compartments on each of which a cake is formed and removed during a filter cycle, a drainage connection to each compartment, a flushing pressure connection to each compartment, valve means controlling automatically the opening of the drainage connection and the application of flushing pressure, and means included in the valve means to effect a circulation of gaseous pressure through the flushing and drainage connections to remove the filtrate from each compartment prior to the discharge of cake therefrom.

3. In a continuous rotary filter, means dividing the filter into a plurality of filter sections, a drainage member connected to each section, a flushing connection to each section, means to create a pressure flow through the filter sections to bring about a filtering action, valve means to remove filtrate successively from the filter sections through the drainage members, means to remove cake from the filter sections successively as it is formed, means included in the valve means to admit pressure to each section to loosen the cake, and other means included in the valve means to admit gaseous fluid pressure into each section through the flushing connection prior to the loosening and removal of cake therefrom and while filtrate still is being removed from said section through the valve means.

4. In a continuous rotary drum type filter, means dividing the drum into a plurality of axially extending filter sections, a drainage conduit connected to the leading side of each section and terminating in a valve plate at the end of the filter drum, a flushing conduit connected to the lagging side of each filter also terminating at said valve plate, a valve cooperating with the valve plate, drainage and pressure connections to the valve, means included in the valve to connect the drainage conduits successively to the drainage connections for a considerable part of the filtering cycle, and further means included in the valve for connecting the flushing conduits successively to the pressure connection during a limited part of the filtering cycle while each associated drainage conduit is still connected to a drainage connection.

5. In a continuous rotary drum filter of the vacuum operated type, means dividing the drum into a plurality of axially extending filter compartments, a drainage conduit connected to the leading side of each compartment, a flushing conduit connected to the lagging side of each compartment, a valve plate at the end of the drum having a row of annular ports to which said drainage conduits are connected and a concentric row of ports to which the flushing conduits are connected, a stationary valve cooperating with the valve plate, means in the valve to connect the compartments successively to the vacuum source through both the drainage and flushing ports for a considerable part of the filtering cycle, means in the valve to connect each compartment to the vacuum source and the pressure source simultaneously through the associated drainage and flushing ports during a further limited part of the filtering cycle, and further means in the valve to connect each compartment to the pressure source only to loosen the cake during a still further limited part of the filtering cycle.

6. In a continuous rotary drum filter of the vacuum operated type, means dividing the drum into a plurality of axially extending filter compartments, a drainage conduit connected to the leading side of each compartment, a flushing conduit connected to the lagging side of each compartment, a valve plate at the end of the drum having a row of annular ports to which said drainage conduits are connected and a concentric row of ports to which the flushing conduits are connected, a stationary valve cooperating with the valve plate and having an annular passage covering the double row of annular ports, vacuum and pressure connections to the valve, a bridge in the passage so disposed that the filter compartments are connected with the vacuum source through the drainage and flushing ports over a considerable arc of revolution of the filter drum, a second bridge in the passage so disposed as to connect a flushing conduit with the pressure source while its associated drainage conduit is connected to the vacuum source after the cake is formed in each compartment and during a limited part of the filtering cycle, and means in said last mentioned bridge to connect each compartment with the pressure source only during a further limited part of the filtering cycle to loosen the cake.

HENRY M. HUNTER.